United States Patent
Bovington (10) Patent No.: US 6,551,508 B1
(45) Date of Patent: Apr. 22, 2003

(54) SEPTIC TANK WASTE WATER FILTER INCLUDING A RESERVOIR FOR FILTERED WASTE WATER

(76) Inventor: Thomas P Bovington, P.O. Box 650, Helena, MT (US) 59624

(*) Notice: Subject to any disclaimer, the term of this patent is extended or adjusted under 35 U.S.C. 154(b) by 0 days.

(21) Appl. No.: 09/661,709

(22) Filed: Sep. 14, 2000

(51) Int. Cl.[7] ............................................. B01D 35/027
(52) U.S. Cl. ..................... 210/256; 210/299; 210/532.2
(58) Field of Search ................................ 210/170, 256, 210/299, 532.2

(56) References Cited

U.S. PATENT DOCUMENTS

| | | | | |
|---|---|---|---|---|
| 5,382,357 A | * | 1/1995 | Nurse ........................ | 210/532.2 |
| 5,492,635 A | * | 2/1996 | Bull ........................... | 210/532.2 |
| 5,635,064 A | * | 6/1997 | Bovington .................. | 210/532.2 |
| 5,904,847 A | * | 5/1999 | Bovington .................. | 210/299 |
| 5,985,139 A | * | 11/1999 | Zoeller ...................... | 210/532.2 |
| 6,136,190 A | * | 10/2000 | Zoeller et al. ............. | 210/532.2 |
| 6,261,452 B1 | * | 7/2001 | Mayer ....................... | 210/532.2 |
| 6,338,797 B1 | * | 1/2002 | Nurse, Jr. et al. ........... | 210/256 |

* cited by examiner

Primary Examiner—Christopher Upton
(74) Attorney, Agent, or Firm—Merek, Blackmon & Voorhees (57) ABSTRACT

The present invention is a waste water filter for use in a septic tank. The waste water filter includes a shield comprising a vertical peripheral wall substantially impervious to the passage of unfiltered waste water. The shield includes an opening for the entry of unfiltered waste water into the interior of the shield. A filter element is disposed substantially within the shield interior. The filter element includes a filter surface having filtering openings for restricting the passage of waste water solids of a size larger than the filtering openings, while allowing the passage relatively clear water. A reservoir within which filtered waste water may be temporarily maintained is disposed at least partially within the interior of the shield. The reservoir includes at least a first vertical peripheral wall defining a chamber. The filter element may be removed from the shield without the separation of the reservoir from the shield.

11 Claims, 14 Drawing Sheets

SEPTIC TANK WASTE WATER FILTER INCLUDING A RESERVOIR FOR FILTERED WASTE WATER

RELATED APPLICATIONS

The present application is related to application Ser. No. 09/250,004 filed Feb. 12, 1999. That application is incorporated herein by this reference.

BACKGROUND

Septic tank waste water filters require maintenance cleaning periodically. The periodic cleaning involves the removal of the filter from the septic tank in which the filter is used. For most waste water filter designs, the removal process is difficult as many gallons of waste water are held within the filter, and the filter in addition to the waste water must be lifted from the septic tank. As a result, the lifting of the filter from the tank requires two or more persons. This greatly increases the labor requirements for a cleaning procedure that would otherwise be performed by a single person. The lifting of a heavy, unwieldy filter full of waste water is possibly injurious to the maintenance personnel who are responsible for this task, Other risks associated with the removal of waste water filters of this type is the risk of disease associated with contacting the waste water. If the filter includes waste water which will also be removed from the tank, the risks of contact with waste water, for those who will perform the maintenance cleaning procedures, greatly increase. Even if substantial precautions are undertaken to avoid contact with the waste water, the removal of waste water creates a very unpleasant situation for the maintenance personnel due to the smells produced by the waste water.

Many waste water filters further complicate the task of filter maintenance by requiring the removal of any discharge or pumping apparatus that may be disposed within the filter before the filter can be removed from the septic tank. In particular, the discharge pipe attached to a pump or dosing siphon would first have to be disassembled from the pump or dosing siphon. Thereafter, the pump or dosing siphon, along with the discharge pipe would need to be removed from the filter. After the filter maintenance is performed, the pump or dosing siphon, and the discharge pipe would need to be reinstalled within the filter. Here again, the labor costs associated with performing the cleaning maintenance are greatly increased due to this extra work. For these reasons, there is a need for a waste water filter that eliminates the need for removing the entire filter from the septic tank for simple filter element cleaning. There is a further need for a waste water filter that eliminates the need to disassemble and remove the pump and discharge pipe attached to the pump, so that simple maintenance cleaning can be performed on the filter element.

SUMMARY

The present invention is a waste water filter for use in a septic tank. The waste water filter includes a shield comprising a vertical peripheral wall substantially impervious to the passage of unfiltered waste water. The shield further includes a top and a bottom. The shield bottom includes an opening for the entry of unfiltered waste water into the interior of the shield. A filter element is disposed substantially within the shield interior. The filter element includes a filter surface having filtering openings for restricting the passage of waste water solids of a size larger than the filtering openings, while allowing the passage of relatively clear water. The filter element further separates a first unfiltered zone within the interior of the shield from a second filtered zone within the shield interior. A reservoir within which filtered waste water may be temporarily maintained is disposed at least partially within the interior of the shield. The reservoir includes at least a first vertical peripheral wall defining a chamber which is in fluid communication with the second zone. The waste water filter further includes means to secure the reservoir to the shield, and means to secure the filter element within the shield. The filter element may be removed from the shield without the separation of the reservoir from the shield.

The first vertical peripheral wall of the reservoir may extend through the bottom of the shield. The means to secure the filter element within the shield may comprise a connection between the filter element and the reservoir. The means to secure the filter element within the shield includes means to restrict the passage of waste water solids. This connection is a typically a frictional fit between the filter element and the reservoir created through the use of a seal of deformable material. The connection is typically disposed between the bottom of the filter element and a portion of the reservoir. However, the means to secure the filter element within the shield may also comprise a connection between the filter element and the shield. Typically, this connection is also a frictional fit between the filter element and the shield created through the use of a seal of deformable material.

The reservoir may include a pump inducer chamber comprising an elongated vertical peripheral wall within which a pump may be disposed. The pump inducer chamber may be disposed at least partially within the interior of the shield, or the pump inducer chamber may be disposed at least partially outside the vertical peripheral wall of the shield.

The waste water filter of the present invention provides benefits which have not previously been available. A first benefit of the invention is derived from the independent manner that the filter element and the reservoir are disposed within the shield. By independently securing the reservoir within the shield, the filter element may be independently removed from the shield for cleaning. This ensures that cleaning of the filter surfaces of the filter element will not be avoided because of the inability or unwillingness of service personnel to lift the reservoir out of the septic tank. The lifting of the reservoir out of the septic tank is undesirable as many gallons of waste water are disposed within the reservoir. It is also undesirable to remove any waste water from within the reservoir from the septic tank. This is due to the known health risks associated with contact with waste water. Although the present invention does not ensure against contact with waste water by service personnel, the present invention clearly minimizes the likelihood of any such contact.

The manner in which the reservoir of the present invention is secured within the shield also allows a variety of filter element configurations to be used within the shield. The manner in which the reservoir of the present invention is secured within the shield is also configured so that disassembly of the reservoir from the shield is easily achieved.

The filter element may be disposed such that the top and bottom of the filter element may not move toward each other within the shield. This configuration of the filter element ensures that collapse of the filter element is not possible.

These and other advantages of the present invention will become apparent upon inspection of the accompanying specification, claims, and drawings.

DESCRIPTION

Figure 1A:
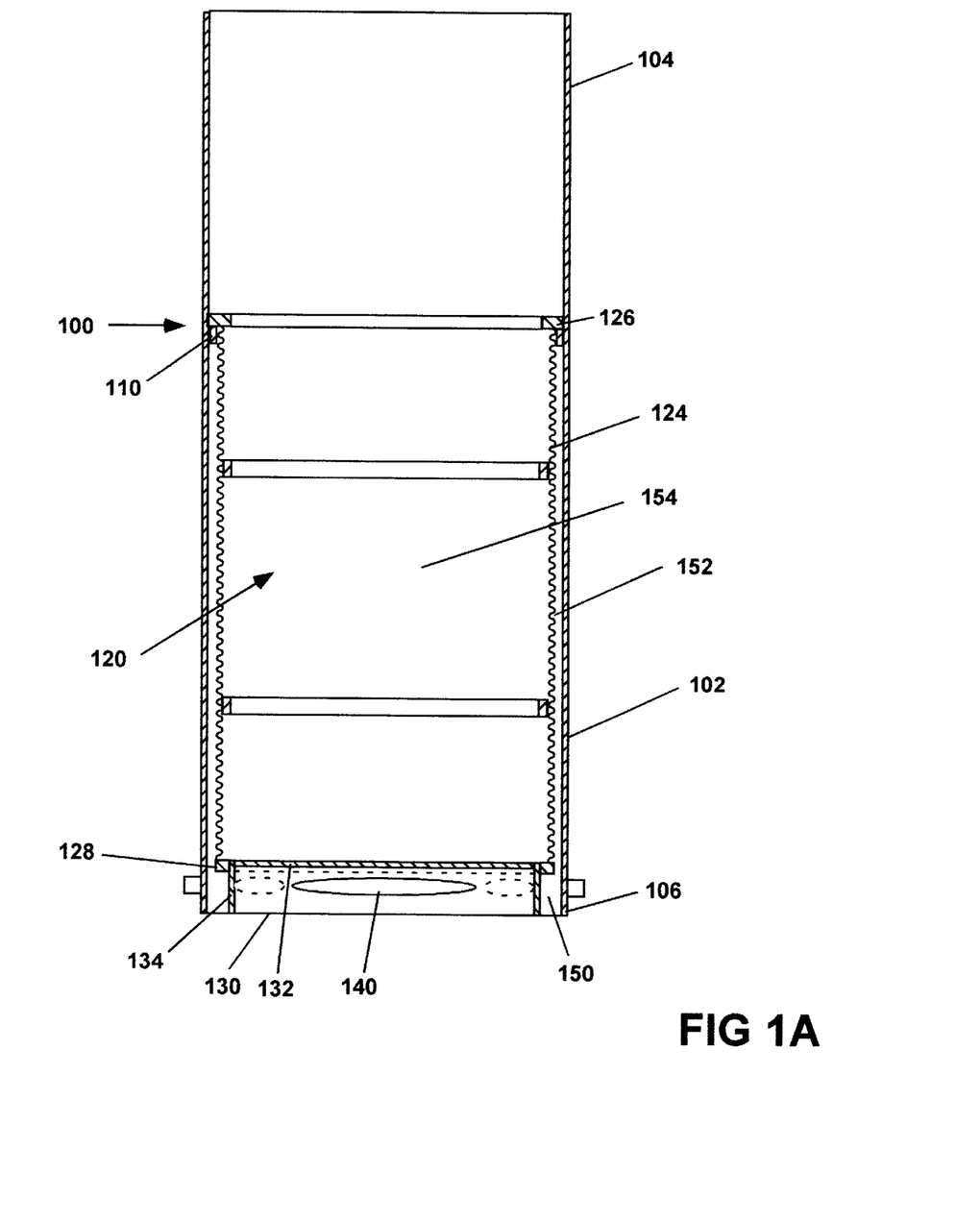
FIG. 1A is a cross sectional side view of a first version of the waste water filter of the present invention.

FIG. 1A shows a first version of the waste water filter 100 of the present invention. The waste water filter 100 includes a shield 102 comprising a vertical peripheral wall which may be of a variety of cross sectional shapes. In this version, the vertical peripheral wall is cylindrical. The shield vertical peripheral wall includes a top 104 and a bottom 106.

A filter element 120 includes a filter surface 124, which in this version is a plastic screen material in the form of a cylinder. The filter surface includes openings through which relatively clear waste water may pass while restricting the passage of waste water solids larger than the openings. The filter element 120 further includes a top seal 126, which rests on the top of a support surface 110 disposed on the inside surface of the shield, and a bottom seal 128, which attaches the filter surface 124 to a filter element bottom 130.

The bottom 130 includes a horizontal plate 132, and a vertical wall 134 extending downwardly from the horizontal plate 132. The vertical wall includes a series of openings (which are not shown in this figure). The openings are aligned with openings (also not shown) which extend through the bottom of the vertical peripheral wall of the shield. An elongated element 140 is shown which passes through two pairs of aligned openings. A similar elongated element passes though each pair of aligned openings. The bottom 130 is temporarily detachably secured to the shield bottom by the elongated elements.

The shield 102 in this version has a bottom opening within which the filter element bottom 130 is disposed. In this version, the entire bottom of the shield is open. Unfiltered waste water enters the interior of the shield through an annular opening 150, which extends around the periphery of the shield interior. The annular opening 150 allows unfiltered waste water to pass into a shield first interior zone 152 which is defined by the area between the filter surface 124 and the interior surface of the shield 102. The unfiltered waste water may pass through the openings within the filter surface into a shield interior second zone 154. Waste water solids larger than the openings within the filter surface are restricted from passing through the filter surface.

Unfiltered waste water in the shield interior first zone 152 is further restricted passage into the second zone 154 by the top seal 126 which may or may not be deformable. Filtered waste water in the second zone is discharged from the filter by a suitable outlet (not shown).

The top and bottom of the filter element are disposed within the shield in such a manner to minimize the possibility of filter surface collapse. This non collapsing property is provided by a configuration where the top and bottom of the filter element cannot move toward each other. Specifically, the top seal 126 of the filter element is supported by the support surface 110, and the bottom of the filter element is secured to the shield by elongate elements 140.

Figure 1B:
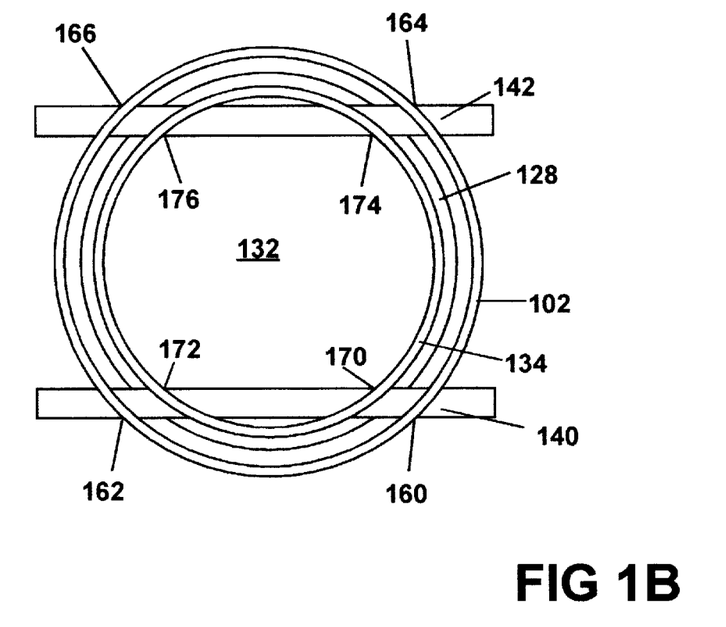
FIG. 1B is a bottom view of the waste water filter of FIG. 1A.

FIG. 1B shows a bottom view of the filter 100 of FIG. 1A. Elongate elements 140 and 142 are shown passing through two pairs of aligned openings. Specifically, elongate element 140 first passes through a first pair of openings comprising a first opening 160 in the shield, and a first opening 170 in the filter element bottom. The elongate element 140 then passes through a second opening 172 in the filter element bottom, and a second opening 162 in the shield. Similarly, elongate element 142 passes through openings 164, 174 and 176, 166. The openings are sized so that the elongate elements frictionally engage the openings so as to ensure that the elongate elements will remain in position. This frictional fit also ensures that waste water solids of a size larger than the openings within the filter surface cannot pass through any gaps which separate the elongate elements from the openings. Glues, sealants, and mechanical fasteners can also be used for securing the elongate elements. The use of glues, sealants, and mechanical fasteners can be in addition to the frictional fit or instead of the frictional fit, if desired.

Figure 1C:
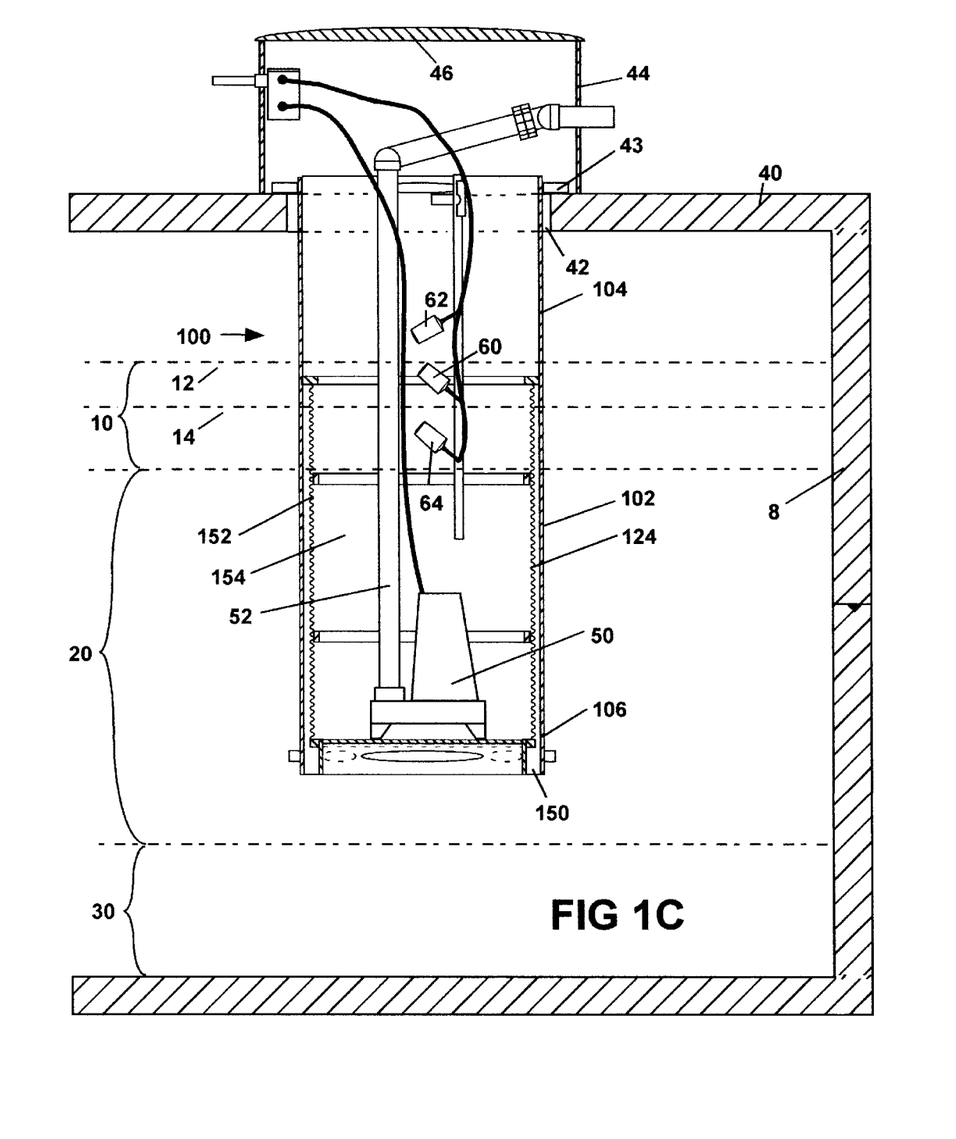
FIG. 1C shows the waste water filter of FIG. 1A disposed in a septic tank.

FIG. 1C shows the waste water filter of FIGS. 1A and 1B in a typical arrangement within a septic tank 8. The septic tank includes three fairly distinct layers of waste water including a top scum layer 10, a middle clear zone 20, and a bottom sludge layer 30. The shield top 104 extends above the scum layer into an access opening 42 within the top of the septic tank 8. A bar support 43 is used to suspend the filter in the septic tank. A riser 44 and lid 46 cover the top opening of the septic tank.

Unfiltered waste water within the clear zone 20 enters through the bottom opening of the shield 150 into the first shield interior zone 152. This unfiltered waste water passes through the filtering openings within the filter surface 124 of the filter element into the second shield interior zone 154.

Relatively clear, filtered waste water which has entered into the second shield interior zone is discharged from the septic tank by a centrifugal pump 50. The centrifugal pump 50 comprises one of many types of incremental discharge devices which may be used in conjunction with the invention. A discharge pipe 52 extends upwardly from the pump and is used to discharge filtered waste to a downstream drain field, leach field, or sand filter. Float switches 60, 62, and 64 which respond to water levels in the tank are used to operate the pump.

Figure 2A:
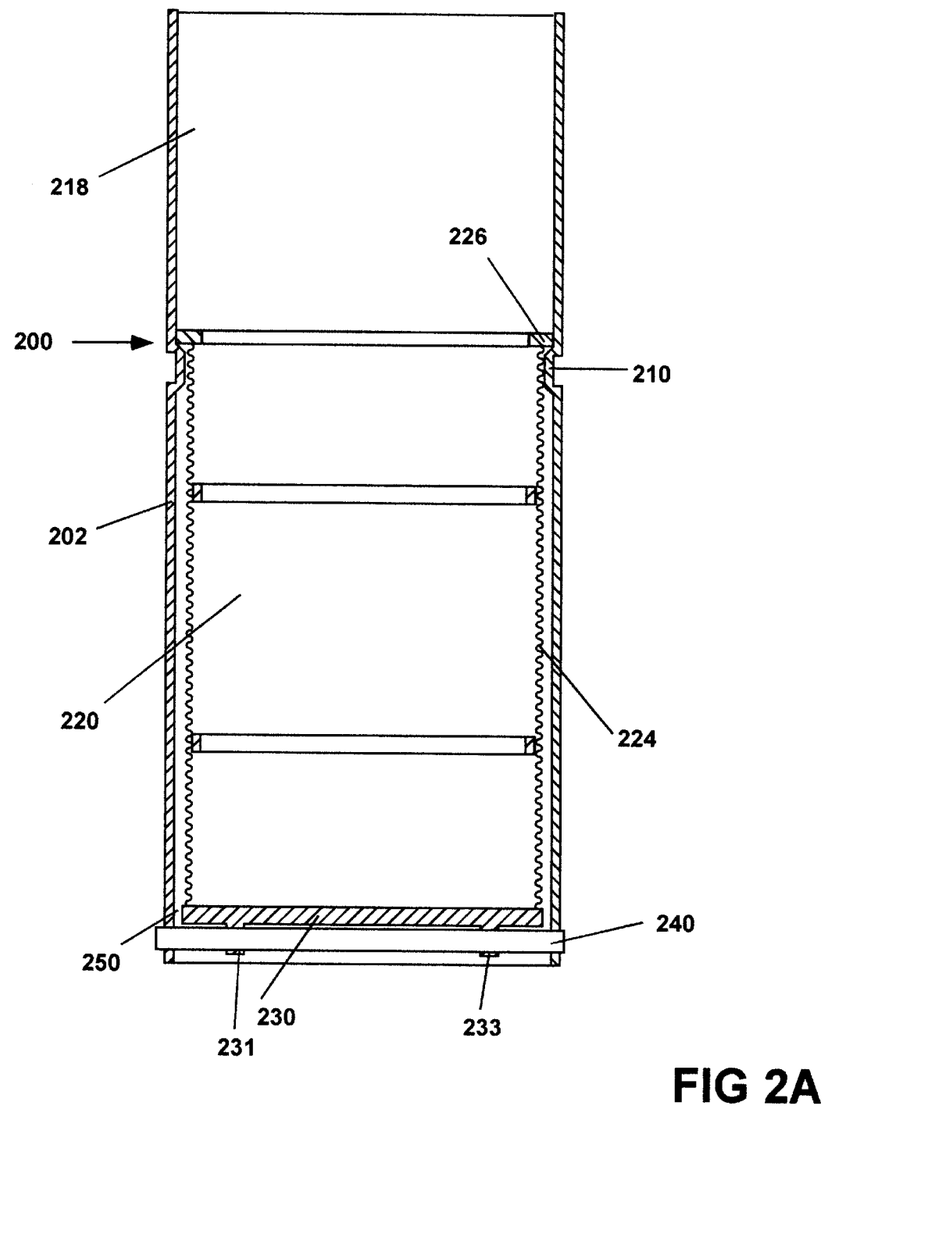
FIG. 2A is a cross sectional side view of a second version of the waste water filter of the present invention.
Figure 2B:
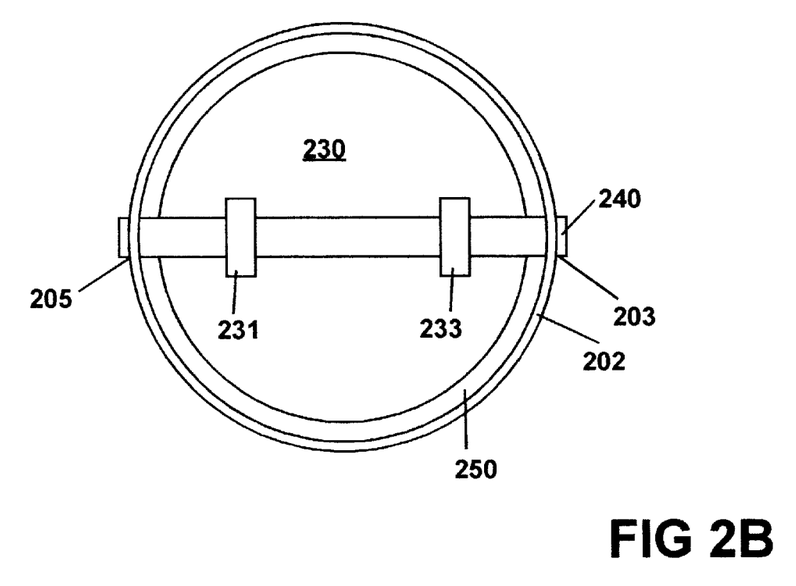
FIG. 2B is a bottom view of the waste water filter of FIG. 2A.

FIGS. 2A and 2B show a version of the Waste water filter 200 which is slightly modified from the first version shown in FIGS. 1A, 1B, and 1C. In this version the filter element 220 includes a filter surface 224 attached to a top seal 226 and to a filter element bottom 230. The top seal 226 rests on a support surface 210 disposed on the shield 202. The filter element bottom 230, as shown in FIGS. 2A and 2B, includes a pair of downwardly extending lugs 231 and 233. The downwardly extending lugs 231 and 233 each include an opening there through. The openings within the lugs are aligned. An elongate element 240 extends through the aligned openings as well as aligned openings 203 and 205 within the shield. The bottom is sized so as to leave an annular opening 250 within the open bottom of the shield through which unfiltered waste water may enter into the shield interior.

Figure 3:
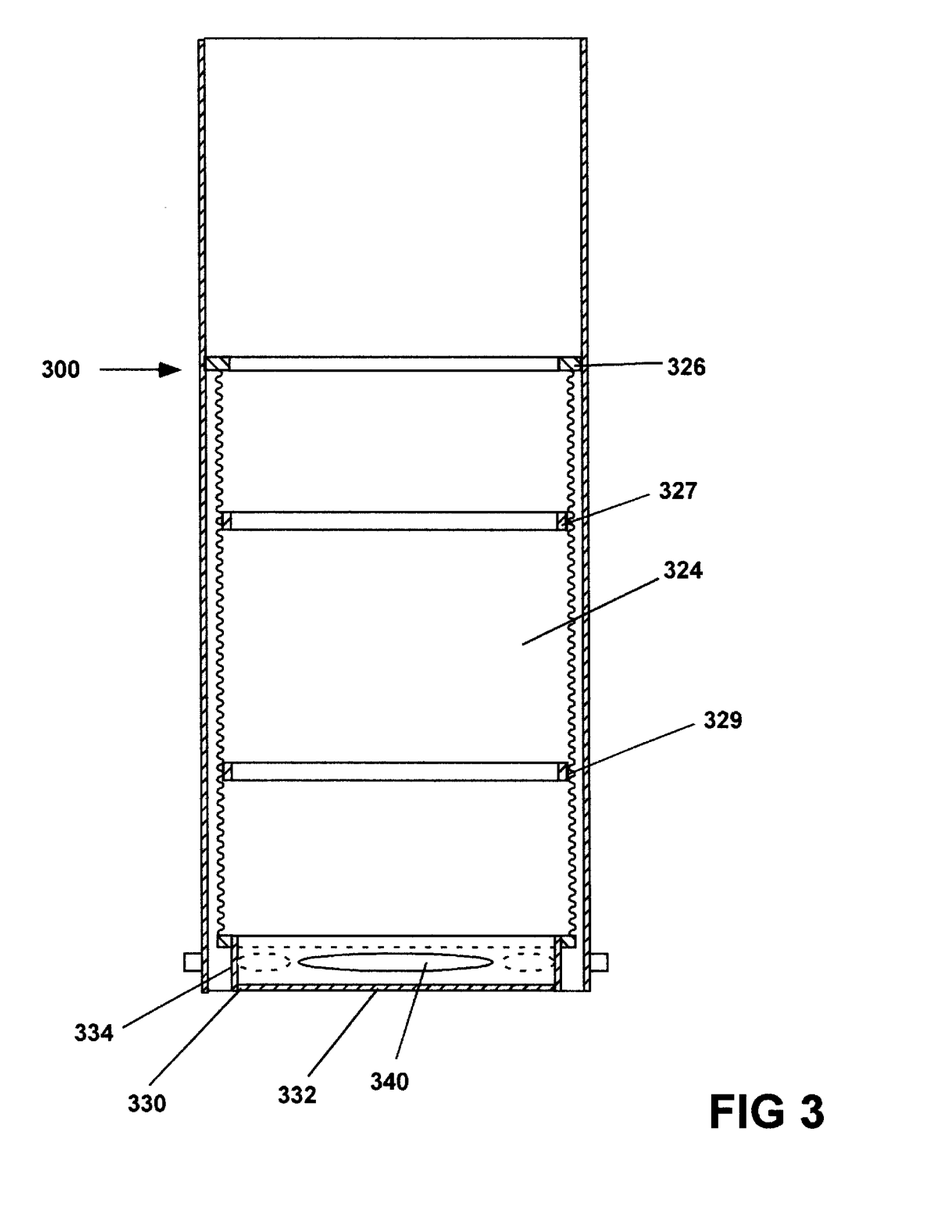
FIG. 3 is a cross sectional side view of a third version of the waste water filter of the present invention.

FIG. 3 shows another version of the waste water filter 300. In this version, the filter element bottom 330 is configured so that the horizontal plate 332 is disposed on the bottom of the vertical wall 334. The bottom 330 is otherwise identical to that shown in FIG. 1A. An elongate element 340 secures the filter element bottom 330 in the same manner as was previously described.

FIG. 3 also shows the omission of a support surface on which the top seal 326 would rest. However, a frictional fit between seal 326 and the shield restricts the movement of the seal relative to the shield. Thus the frictional fit minimizes the possibility of the filter surface collapsing. In this way, the frictional fit results in the shield supporting the top of the filter element. Accordingly, in situations where the filter surface 324 has sufficient rigidity to not collapse under pressure, the top support can be eliminated. Structural elements 327 and 329 are used in this version to assist the strength of the filter element to minimize the likelihood of collapse.

Figure 4:
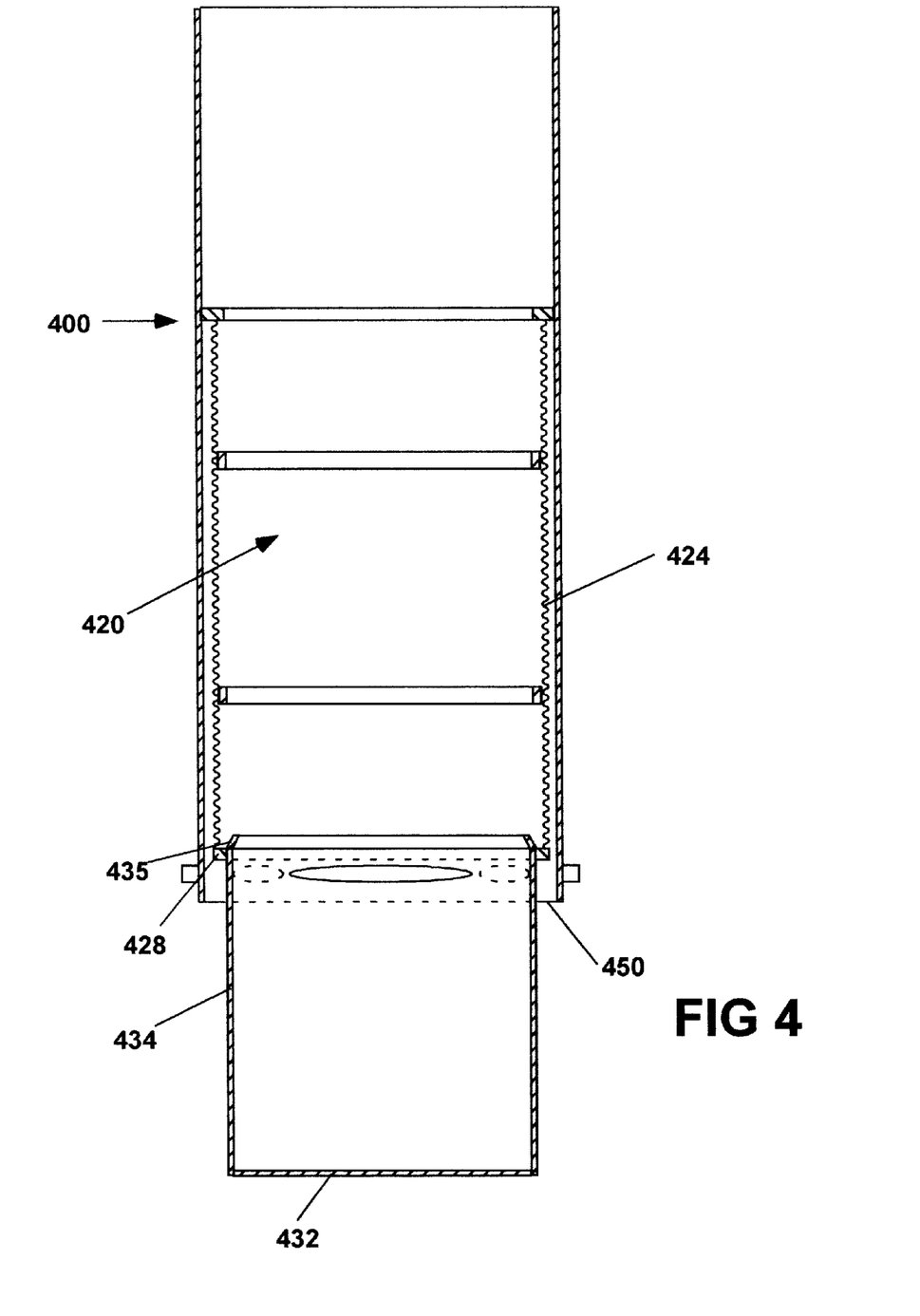
FIG. 4 is a cross sectional side view of a fourth version of the waste water filter of the present invention.

FIG. 4 is a version of the waste water filter 400 which is similar to that shown in FIG. 3. However, in this version, the vertical wall of the filter element bottom is lengthened by being extended downwardly. The horizontal plate 432 is substantially beneath the bottom of the shield. By extending the length of the vertical wall 434, the filter element bottom becomes a reservoir chamber in which filtered waste water is maintained. The reservoir essentially enlarges the second shield interior zone of the waste water filter. The reservoir may also be used as a pump vault. The annular bottom opening 450 is not affected by the increased length of the filter element bottom.

FIG. 4 also shows a tapered top 435 disposed on the vertical wall 434. In this configuration, a seal 428 is shown disposed on the bottom of the filter element 420. This seal forms a temporary, detachable securement with the top of the vertical wall 434 through the use of a frictional fit. The seal 428 slides over the tapered top 435 allowing the filter element to be easily installed onto the reservoir. This feature is important should the filter element 420 be removed from the filter 400 while the reservoir remains in place secured to the shield. This feature allows the filter element 420 to be removed for cleaning and easily reinstalled within the shield.

In versions of the invention such as FIG. 4 where the filter surface is detachably secured to the reservoir, and where the reservoir is secured to the shield, the reservoir may be considered a structural entity independent of the filter element. Accordingly, in these versions the expression "filter element" would describe the filter surface and any seals attached thereto.

Figure 5:
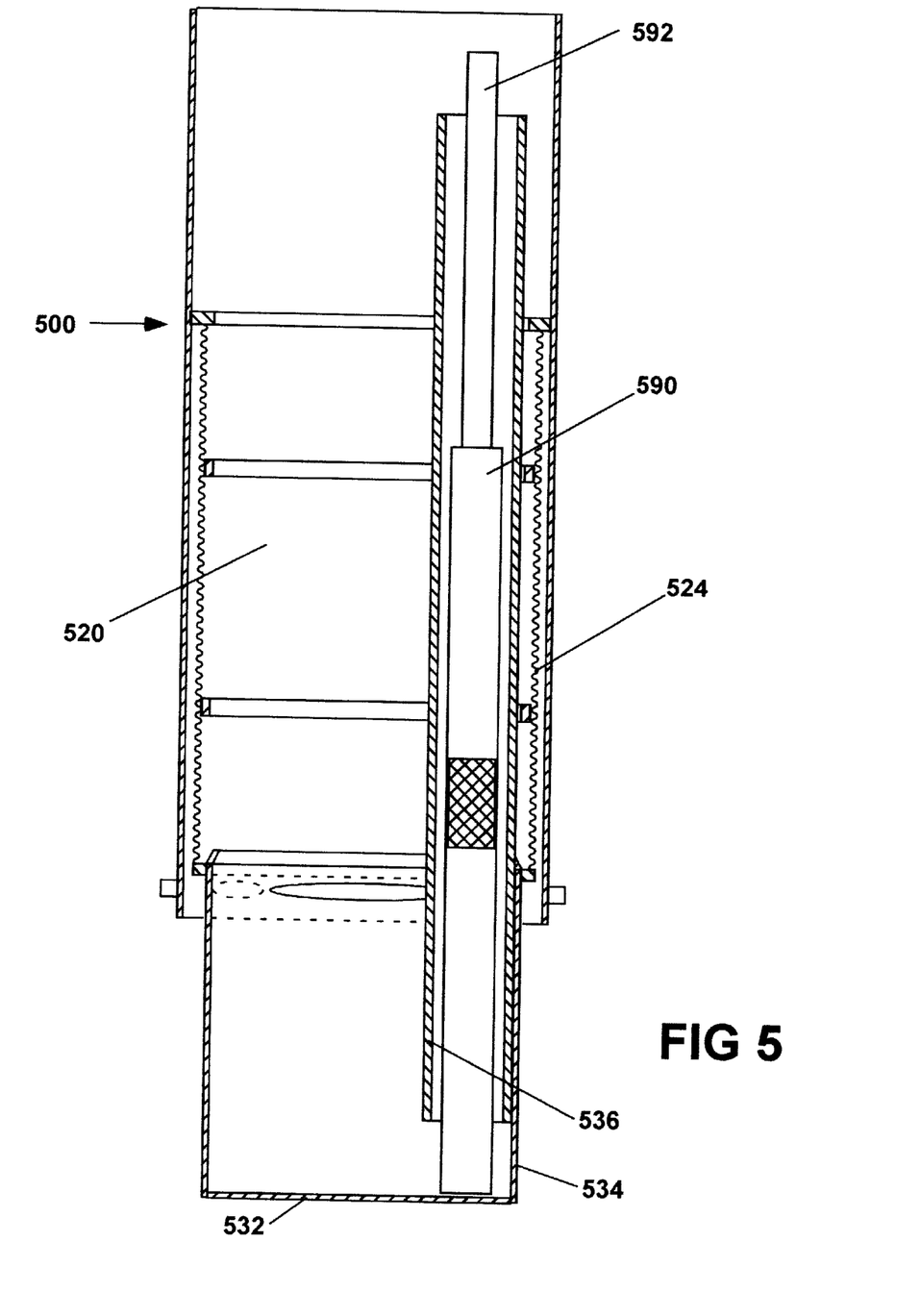
FIG. 5 is a cross sectional side view of a fifth version of the waste water filter of the present invention.

FIG. 5 shows another version of the waste water filter 500 of the present invention. In this version, a pump inducer 536 comprising a vertical peripheral wall having an open bottom is disposed within the filter element interior. The pump inducer is shown attached to the vertical wall 534 of the reservoir. A jet pump 590 is disposed within the pump inducer. The top of the pump inducer is open to allow a discharge pipe 592 to exit out the inducer. Filtered waste water within the reservoir is drawn upward into the pump inducer by a suction created by the jet pump.

Should the filter surface 524 require cleaning, the filter element 520 including the filter surface 524 can be removed by lifting the filter element upward. The pump will not need to be removed from the pump inducer for this simple procedure. However, a discharge pipe attached to the pump would need to be disassembled from the pump. The reservoir would not need to be detached from the shield for this procedure.

Figure 6:
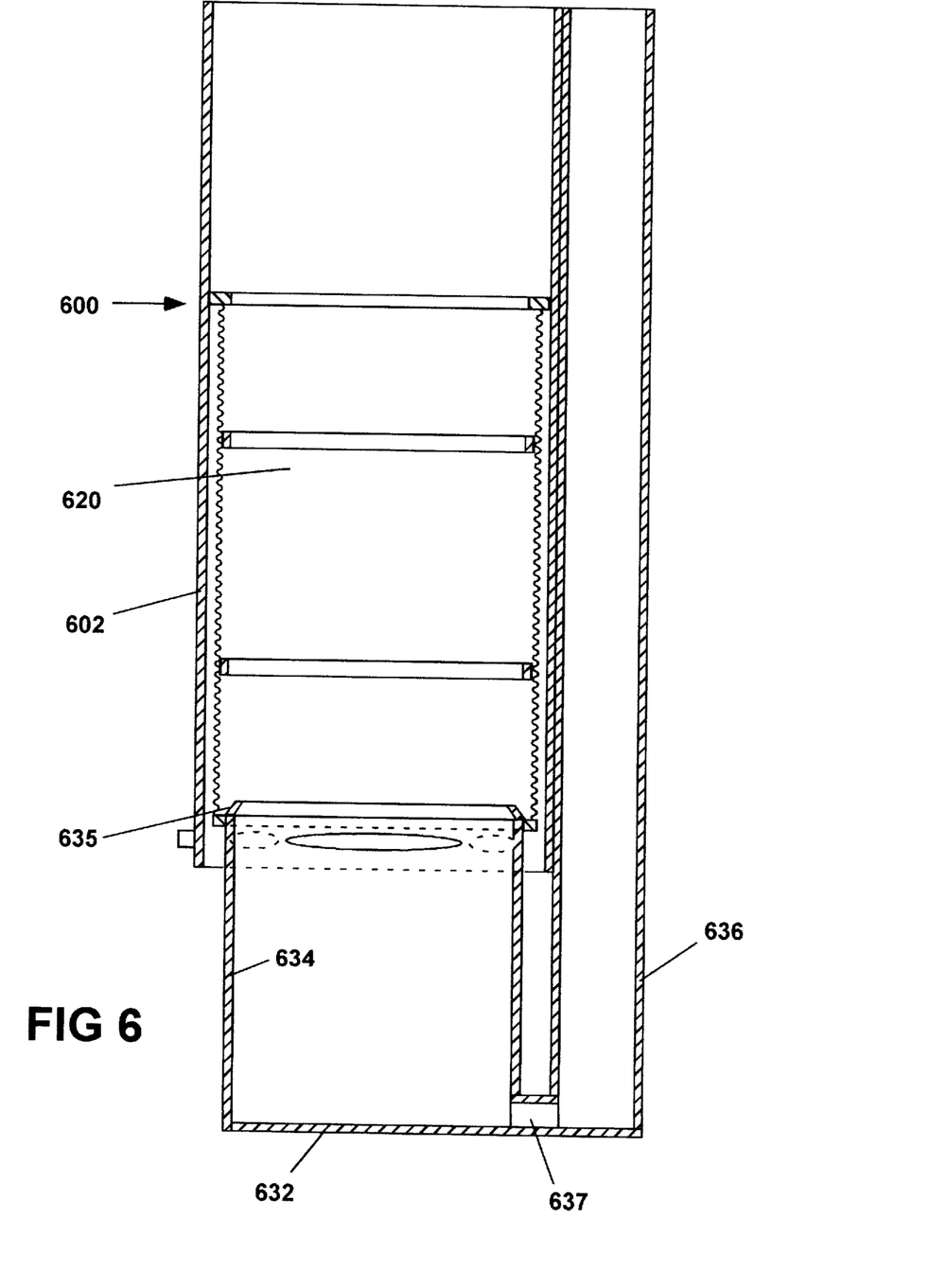
FIG. 6 is a cross sectional side view of a sixth version of the waste water filter of the present invention.

FIG. 6 shows a version of the waste water filter 600 which is a modified version of the waste water filter of FIG. 4. In this version, a pump inducer 636 is disposed outside the shield 602. A fitting 637 is used to connect the interior of the reservoir to the interior of the pump inducer 636. Filtered waste water within the reservoir is transferred to the pump inducer through the fitting 637. The removal and reinstallation of the of the filter element 620 is further simplified by this design.

Figure 7:
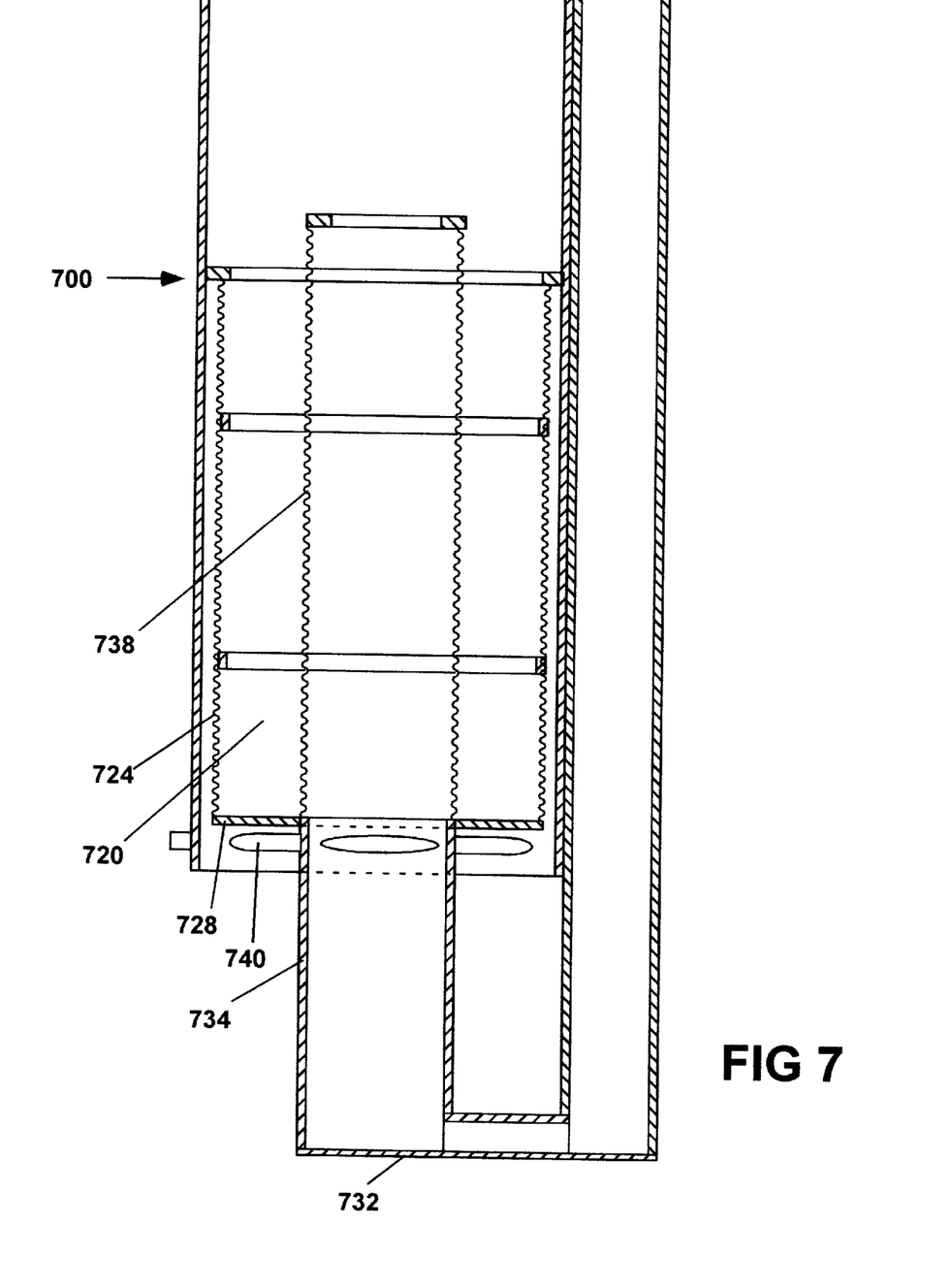
FIG. 7 is a cross sectional side view of a seventh version of the waste water filter of the present invention.

FIG. 7 shows a version of the waste water filter 700 including a modified reservoir. The vertical peripheral wall 734 of the reservoir is of a smaller diameter than that shown in FIG. 6. The seal 728 is sized to accommodate the smaller diameter vertical peripheral wall. The reservoir includes a bottom plate 732 and an upper filter surface 738 which extends upwardly from the vertical wall 734. This filter surface 738 provides benefits while the filter surface 724 is removed for cleaning maintenance. Specifically, the upper filter surface provides protection for the outlet by preventing unfiltered waste water solids which have entered into the shield second zone, after filter element 720 removal, from being discharged. Alternatively, the filter surface 738 may include filter openings of a smaller size than those of the filter surface 724. This would provide a two stage filtering of waste water by the filter 700 when both filter surfaces are in place.

Figure 8:
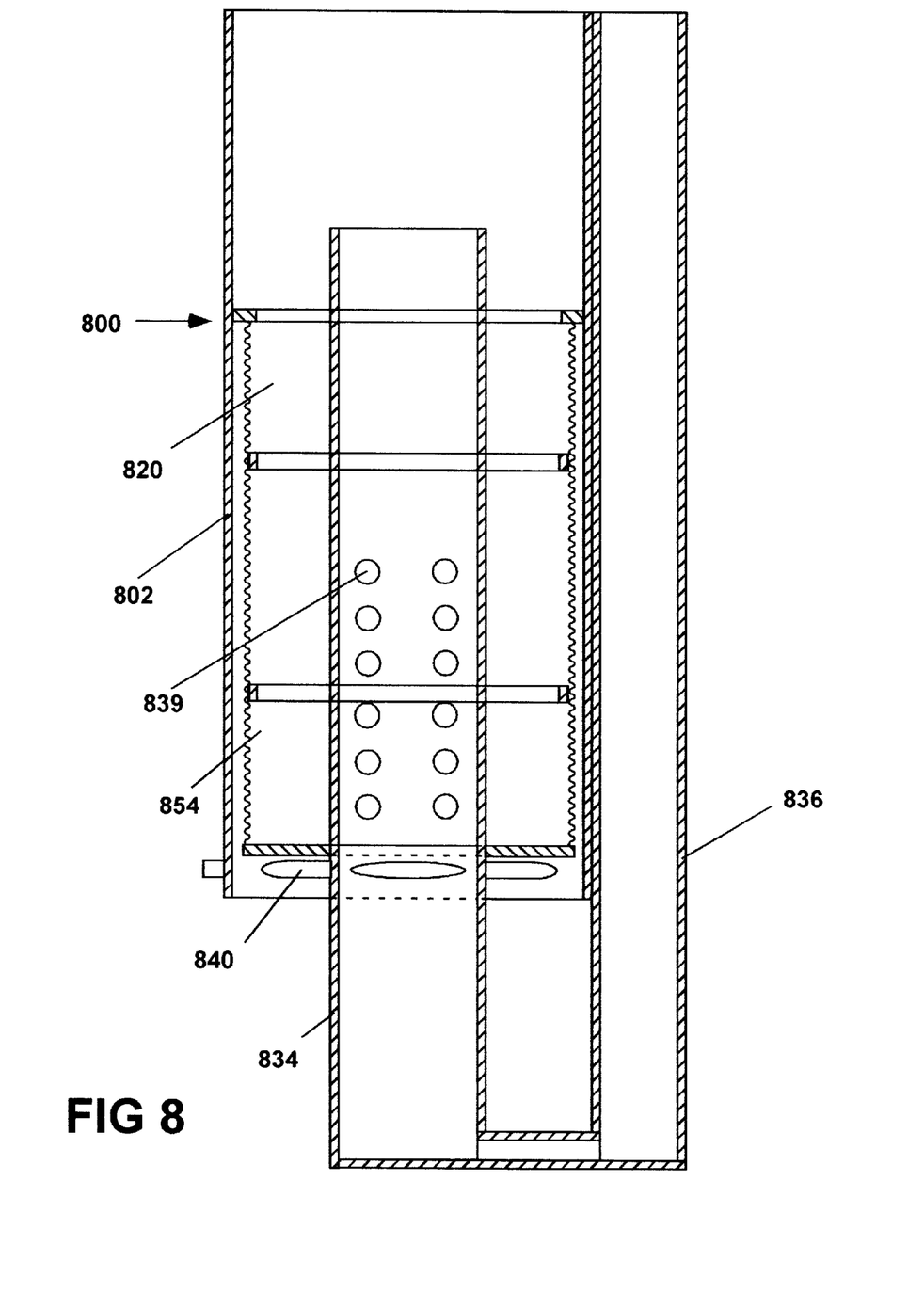
FIG. 8 is a cross sectional side view of a eighth version of the waste water filter of the present invention.

FIG. 8 shows another version of the waste water filter 800. In this version, the vertical peripheral wall 834 of the reservoir extends upwardly toward the top of the shield 802. The vertical wall includes modulating orifices 839 which modulate the flow of filtered waste water from the shield second interior zone 854 into the reservoir, and thus into the pump inducer 836. In this version, the filter element 820 may use the elongate elements such as are shown at 840 as a support surface which would limit the extent to which a filter element could extend downwardly into the shield during reinstallation. The elongate element 840 is used to secure the reservoir to the shield.

Figure 9:
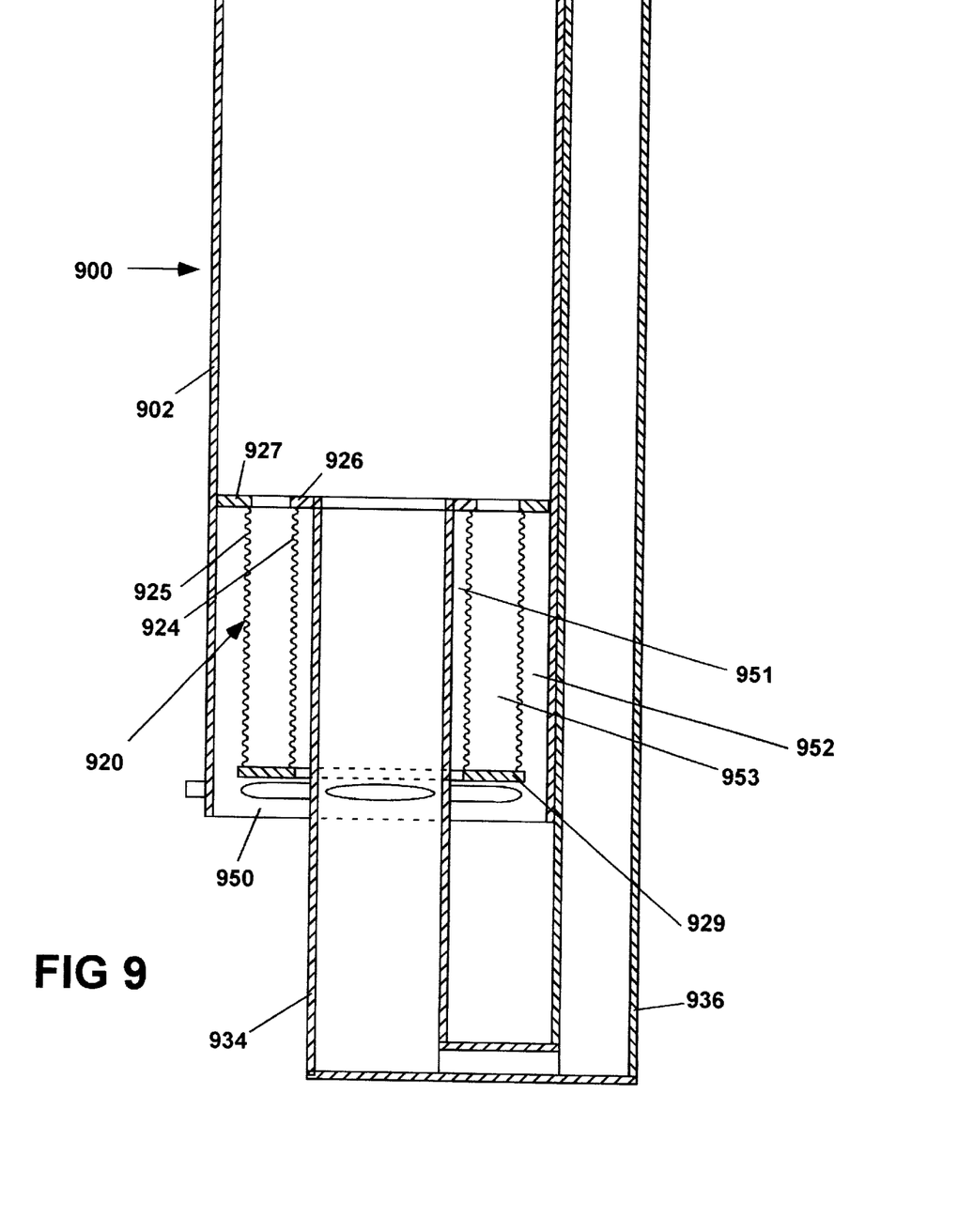
FIG. 9 is a cross sectional side view of a ninth version of the waste water filter of the present invention.

FIG. 9 shows another version of the invention 900. In this version, the filter element 920 includes a first filter surface 924 and a second filter surface 925 disposed outside the first filter surface. Both filter surfaces comprise vertical peripheral walls. The bottoms of the first and second filter surfaces are attached by an annular plate 929. A first annular seal 926 is attached to the top of the first filter surface 924. This annular seal forms a seal with the outer surface of the reservoir vertical wall 934. A second annular seal 927 is attached to the top of the second filter surface 925. Seal 927 forms a seal with the inside surface of the shield 902. Annular seals 926 and 927 are used to frictionally engage the inside surface of the shield and the outside surface of the reservoir vertical wall. This frictional engagement provides the means through which the filter element is secured within the shield.

Unfiltered waste water enters into a shield interior first zone through the bottom opening 950. The shield interior first zone includes a first area 951 inside the first filter surface 924 and a second area 952 outside the second filter surface 925. Unfiltered waste water in the area 951 must pass through first filter surface 924. Unfiltered waste water in area 952 must pass through second filter surface 925. Filtered waste water which has passed through either of the filter surfaces is maintained in the area between the two filter surfaces 953. Area 953 is part of the second shield interior zone within which filtered waste water is maintained. The filtered waste water in the second shield interior zone passes into the reservoir through the open top of the vertical peripheral wall 934 of the reservoir. The filtered waste water is discharged from the reservoir via a pump (not shown) disposed within the pump inducer 936.

Figure 10A:
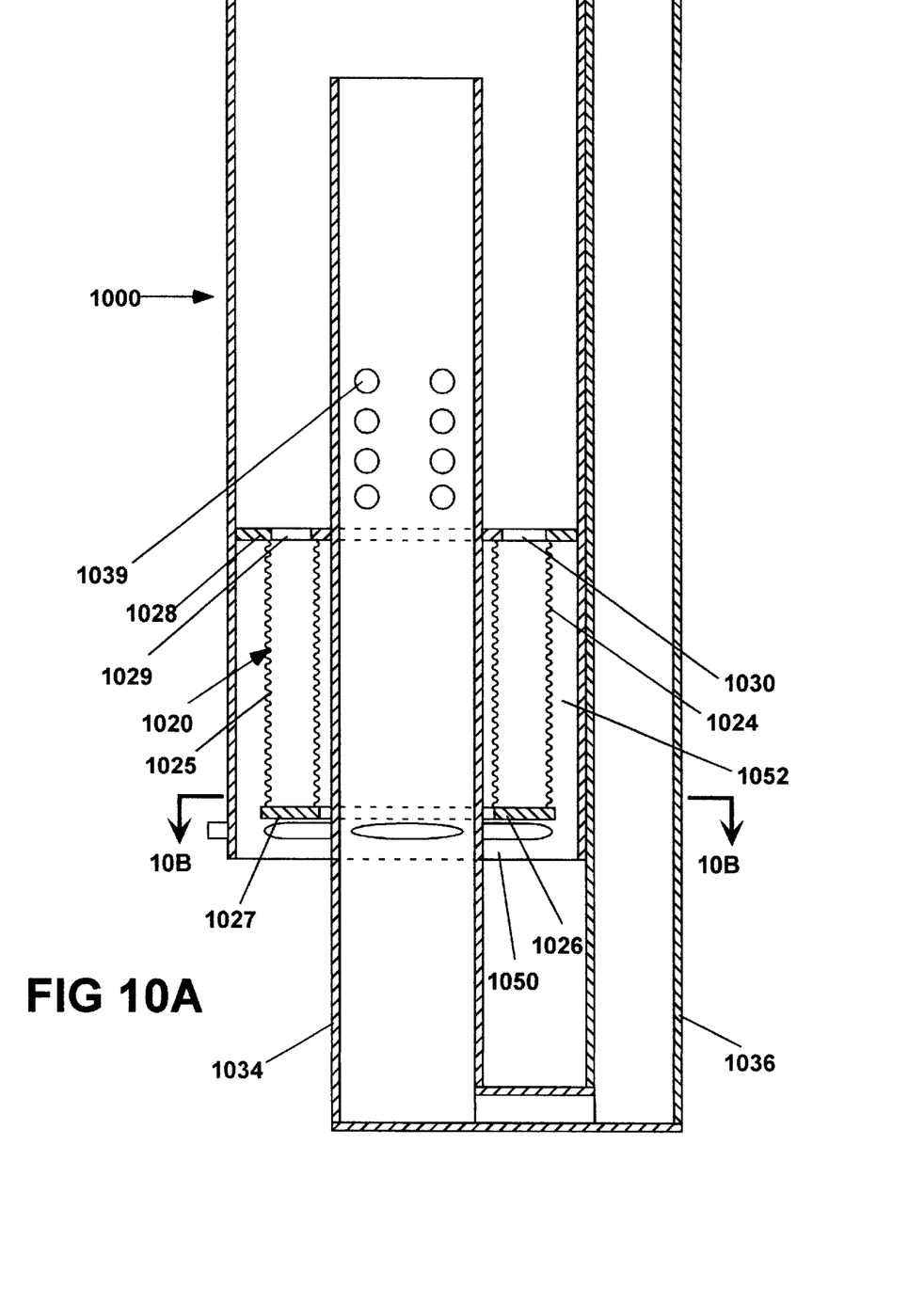
FIG. 10A is a cross sectional side view of a tenth version of the waste water filter of the present invention.
Figure 10B:
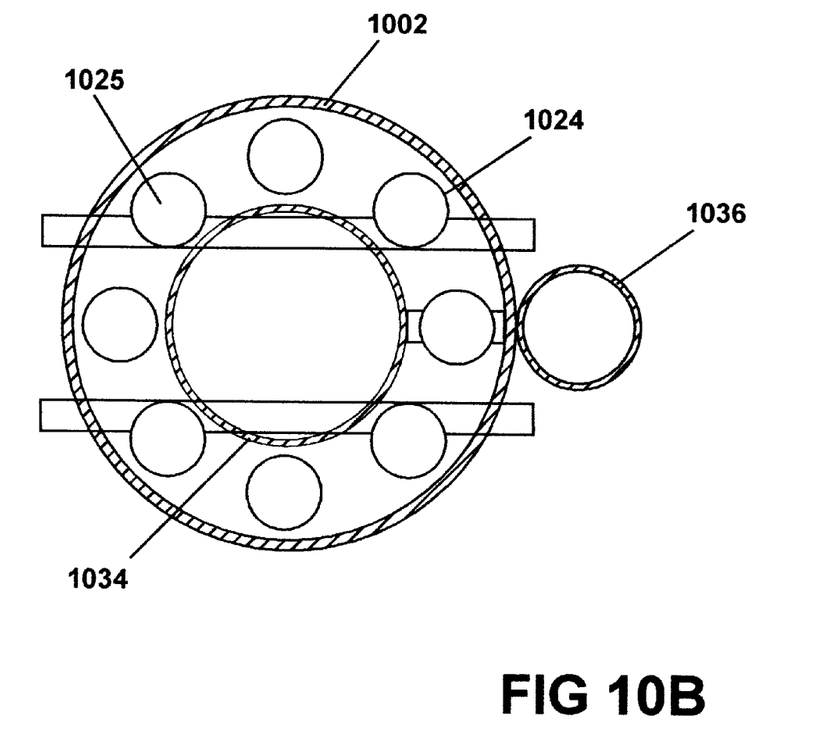
FIG. 10B is a cross sectional top view of the bottom waste water filter of FIG. 10A.

FIGS. 10A and 10B show another version of the waste water filter 1000 of the present invention. This version includes a filter element 1020 having a series of tubular filter enclosures as are shown at 1024 and 1025. Each tubular filter enclosure includes a bottom plate as is shown at 1026 and 1027. An annular seal ring 1028 forms a seal with the outer surface of the vertical wall 1034 of the reservoir, and also with the inner surface of the shield 1002. Within the annular seal ring 1028 are openings associated with each tubular filter enclosure, as is shown at 1029 and 1030.

Unfiltered waste water enters into the shield interior first zone 1052 through the bottom opening 1050 of the shield. This unfiltered waste water can pass into the shield interior second zone by passing through the filter surface of any of the tubular filter enclosures. This filtered waste water is discharged from the filter in the same manner as was previously described.

FIG. 10B shows is a view showing the relative positions of the tubular filter enclosures of this version. Obviously, other positions of the filter enclosures are possible.

The waste water filter versions of FIGS. 9 and 10 include the same benefits of the earlier described versions. In particular, benefits are derived from the attachment of the reservoir to the shield, and from the easy removal of the filter element from the shield. The filter element again is removed from the shield by merely lifting up on the element. The reservoir remains in place during this process. The filter element is also easily reinstalled within the shield and typically forms a seal with the shield and the reservoir.

Figure 11:
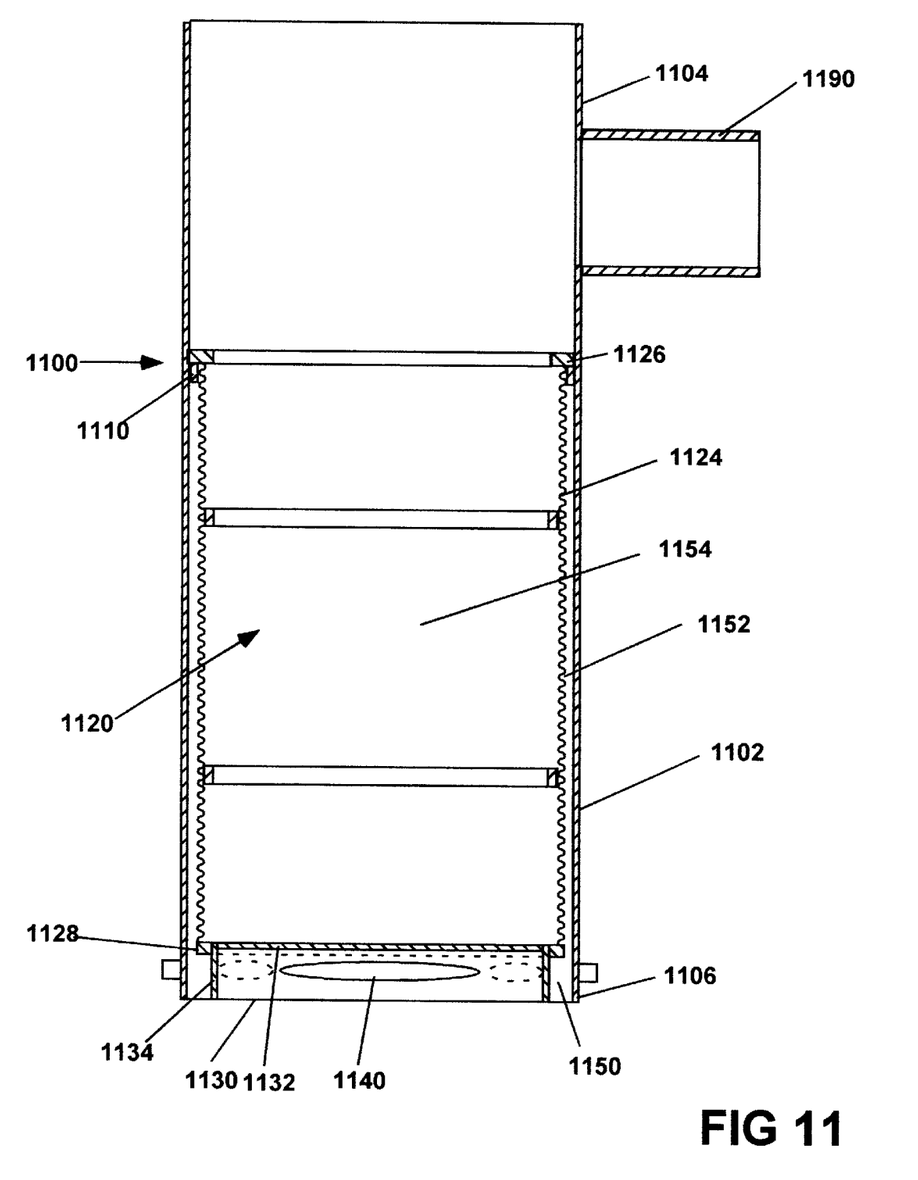
FIG. 11 shows a modified version of FIG. 1 where the filters includes an outlet fitting onto which a discharge pipe would be attached for gravity flow discharge.

FIG. 11 shows a modified version of FIG. 1 where the filter includes an outlet fitting onto which a discharge pipe would be attached for gravity flow discharge.

Different versions of the invention have been shown in FIGS. 1 to 11. It is understood that features of each version are fully transferrable to other versions. Although only the first version has been shown disposed in a septic tank, it is understood that all versions of the invention would be similarly used within a septic tank. It is also understood that modifications to each version are also possible. Such modifications include the use of cross sectional shaped other than circular for the various vertical peripheral walls used in the filters. Although each version has been shown with a filter surface created from a screen material it is understood that many different filter surfaces are also possible. Such filter surfaces include molded plastic assemblies having slotted or perforated openings of the desired size.

The filter has been shown with a shield having a bottom opening though which unfiltered waste water enters into the filter interior. This bottom opening could be replaced with a series of filtering orifices which would provide a pre-filtering property to the shield.

The structure used to secure the reservoir to the shield has been shown as an elongate element passing through aligned holes. It is understood that other structures such as properly sized spacers could be used for this purpose. Additionally, the reservoir and shield could be molded together in a single homogenous assembly. Other incremental discharge devices such as dosing siphons could, of course, be used in place of pumps. Deformable or non-deformable seals may be used in each version of the invention.

Although preferred versions of the invention have been shown and described in FIGS. 1 to 10 it is understood that various other modifications and changes in form or detail could readily be made without departing from the spirit of the invention. It is therefore intended that the invention be not limited to the exact form and detail herein shown and described, nor to anything less than the whole of the invention herein disclosed and as hereinafter claimed.

I claim:

1. A septic tank waste water filter for use in a septic tank comprising:

a shield comprising a vertical peripheral wall substantially impervious to the passage of unfiltered waste water; the shield further having a top and a bottom; the shield including an opening for the entry of unfiltered waste water into the interior of the shield;

a filter element disposed substantially within the shield interior;

the filter element including a filter surface having filtering openings for restricting the passage of waste water solids of a size larger than the filtering openings; while allowing the passage relatively clear water;

the filter element further separating a first unfiltered zone within the interior of the shield from a second filtered zone within the shield interior;

a reservoir including at least a first vertical peripheral wall defining a chamber within which filtered waste water may be temporarily maintained; the reservoir in fluid communication with the second zone; and, wherein the reservoir is disposed at least partially within the interior of the shield;

and, means to secure the reservoir to the shield, wherein the first vertical peripheral wall of the reservoir extends through the bottom of the shield; and means to secure the filter element within the shield; wherein the filter element may be removed from the shield without the separation of the reservoir from the shield.

2. The waste water filter of claim 1, wherein the means to secure the filter element within the shield comprises a connection between the filter element and the reservoir; and wherein the means to secure the filter element within the shield includes means to restrict the passage of waste water solids.

3. The waste water filter of claim 2, wherein the connection is a frictional fit between the filter element and the reservoir.

4. The waste water filter of claim 3, wherein the connection includes a seal of deformable material.

5. The waste water filter of claim 2, wherein the connection is disposed between the bottom of the filter element and a portion of the reservoir.

6. The waste water filter of claim 1, wherein the means to secure the filter element within the shield comprises a connection between the filter element and the shield.

7. The waste water filter of claim 6, wherein the connection includes a seal of deformable material.

8. The waste water filter of claim 1, wherein the reservoir includes a pump inducer chamber comprising an elongated vertical peripheral wall within which a pump may be disposed.

9. The waste water filter of claim 8, wherein the pump inducer chamber is disposed at least partially within the interior of the shield.

10. The waste water filter of claim 8, wherein the pump inducer chamber is disposed at least partially outside the vertical peripheral wall of the shield.

11. In combination a septic tank and a waste water filter for use in the septic tank, the waste water filter comprising:

a shield comprising a vertical peripheral wall substantially impervious to the passage of unfiltered waste water; the shield further having a top and a bottom; the shield bottom including an opening for the entry of unfiltered waste water into the interior of the shield;

a filter element disposed substantially within the shield interior;

the filter element including a filter surface having filtering openings for restricting the passage of waste water solids of a size larger than the filtering openings; while allowing the passage relatively clear water;

the filter element further separating a first unfiltered zone within the interior of the shield from a second filtered zone within the shield interior;

a reservoir including at least a first vertical peripheral wall defining a chamber within which filtered waste water may be temporarily maintained; the reservoir in fluid communication with the second zone; and, wherein the reservoir is disposed at least partially within the interior of the shield;

and, means to secure the reservoir to the shield, wherein the first vertical peripheral wall of the reservoir extends through the bottom of the shield; and means to secure the filter element within the shield; wherein the filter element may be removed from the shield without the separation of the reservoir from the shield.

* * * * *